United States Patent
Spencer

(10) Patent No.: US 6,349,794 B2
(45) Date of Patent: Feb. 26, 2002

(54) PROTECTION PLUG

(76) Inventor: R. Wilson Spencer, 29 Legend La., Houston, TX (US) 77024

( * ) Notice: Subject to any disclaimer, the term of this patent is extended or adjusted under 35 U.S.C. 154(b) by 0 days.

(21) Appl. No.: 09/302,835

(22) Filed: Apr. 30, 1999

(51) Int. Cl.$^7$ ................................................ F16N 21/00
(52) U.S. Cl. ................................. 184/105.3; 184/88.1
(58) Field of Search .................................. 184/5.1, 45.1, 184/88.1, 92, 93, 95, 105.3

(56) References Cited

U.S. PATENT DOCUMENTS

| | | | | |
|---|---|---|---|---|
| 309,840 A | * | 12/1884 | Fink | 185/95 |
| 340,385 A | * | 4/1886 | Smith | 184/88.1 |
| 612,036 A | * | 10/1898 | Hanson | 184/95 |
| 660,894 A | * | 10/1900 | Ernst | 184/88.1 |
| 691,570 A | * | 1/1902 | Ritter | 184/88.1 |
| 787,466 A | * | 4/1905 | Preece | 184/88.1 |
| 928,417 A | * | 7/1909 | Allen | 184/88.1 |
| 1,119,902 A | * | 12/1914 | Vissering | 184/92 |
| 1,296,943 A | * | 3/1919 | Fraser | 184/88.1 |
| 1,296,944 A | * | 3/1919 | Frick | 184/88.1 |
| 1,423,112 A | * | 7/1922 | Hoagland | 184/95 |
| 1,656,555 A | * | 1/1928 | Brooks | 184/105.3 |
| 1,660,728 A | * | 2/1928 | Stokes | 184/105.3 |
| 2,526,155 A | * | 10/1950 | Phelps | 184/105.3 |
| 3,077,948 A | * | 2/1963 | Law | 184/45.1 |
| 3,955,852 A | * | 5/1976 | De Puydt et al. | 184/45.1 |
| 4,058,185 A | * | 11/1977 | Ploeger | 184/5.1 |
| 4,106,816 A | * | 8/1978 | August | 184/5.1 |
| 4,508,372 A | * | 4/1985 | White | 184/105.3 |
| 4,595,080 A | * | 6/1986 | Shay | 184/105.3 |
| 5,054,859 A | * | 10/1991 | Goettker | 184/45.1 |
| 5,584,359 A | * | 12/1996 | Reinersman | 184/45.1 |
| 5,709,284 A | * | 1/1998 | Shultz, Sr. | 184/5.1 |

FOREIGN PATENT DOCUMENTS

| | | | | |
|---|---|---|---|---|
| AU | 282223 | * | 4/1967 | 184/88.1 |
| CH | 227842 | * | 4/1967 | 184/88.1 |
| GB | 236967 | * | 11/1925 | 184/105.3 |

* cited by examiner

Primary Examiner—David A. Bucci
Assistant Examiner—Chong H. Kim
(74) Attorney, Agent, or Firm—Jones, Walker, Waechter, Poitevent, Carrere & Denegre, L.L.P.

(57) ABSTRACT

A plug for protecting the interior of a recessed area of a component during storage is disclosed herein. The plug includes a lubrication fitting positioned thereon to flow a protective material, such as grease, into the cavity between the lower end of the plug and the recessed area and any remaining voids between the walls of the plug and the walls of the recessed area. The plug may also include an engagement surface to assist in the insertion and removal of the plug into and out of recessed areas of a component.

16 Claims, 3 Drawing Sheets

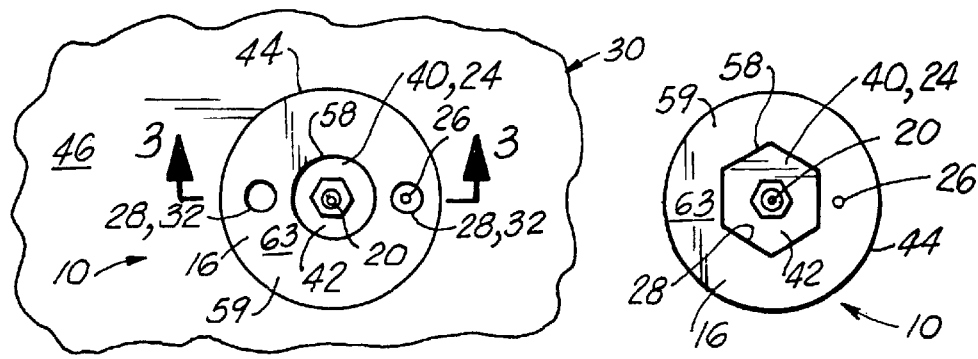
FIG. 1  FIG. 1-A
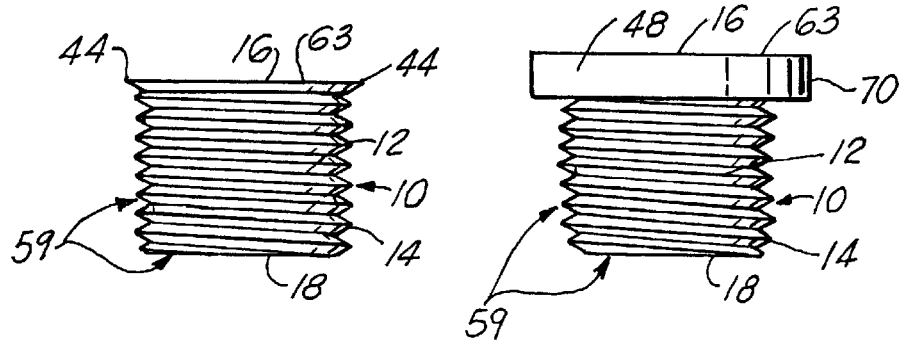
FIG. 2  FIG. 2-A
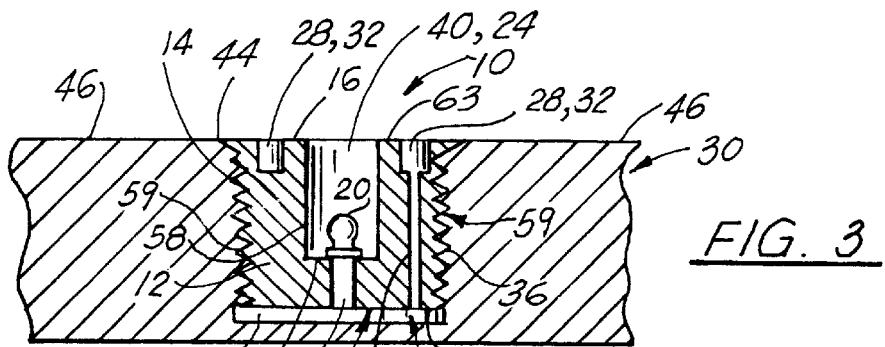
FIG. 3
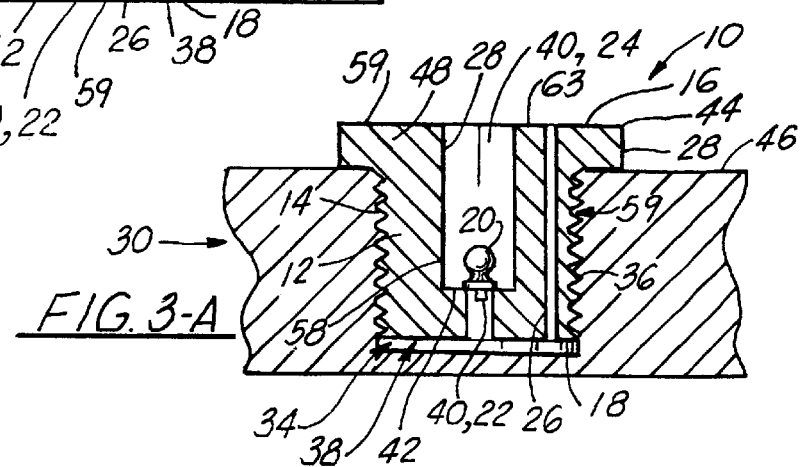
FIG. 3-A

PROTECTION PLUG

BACKGROUND OF THE INVENTION

1. Field of the Invention

This invention relates to devices for protecting internal areas of large cast or machined components, namely the internal threads.

2. Prior Art

Large castings and machined components having internal threads are often placed outdoors for temporary storage. Accordingly, these components are subject to moisture and other damaging weather and environmental conditions. While many parts of the components do not suffer significant damage, the threads which are machined into metal surfaces often must be re-machined after the components have been exposed to the elements and damaged. Re-machining of threads significantly increases the turnaround time and is expensive, particularly in the case of leased equipment.

In some instances, these components are temporarily stored outdoors and stacked on top of each other. If there are any protrusions that extend beyond the surfaces on which the components rest, the protrusions are broken or sheared off during the stacking process, allowing water that often contains corrosive agents, to seep in and destroy the threads. Thus, a long-standing need exists for a device that protects threads in components from the destructive effects of weather and harsh operating conditions and that does not have any protrusions extending beyond the stacking surface.

Stationary surfaces, such as the decks of ships, also have threaded recessed areas configured therein that may be exposed to saltwater and the elements. The threads must be protected from the elements and effects of saltwater and must be flush with the deck surface so as not to produce a trip hazard. In the event of an emergency, these thread protection devices may have to be removed very quickly and with minimum effort. The very safety of the ship could depend on it. Therefore, it is imperative that the threads be protected from even the slightest hint of corrosion of any kind.

ADVANTAGES AND OBJECTS OF THE INVENTION

The present invention meets needs existing in the prior art. The thread protection plug of the present invention is designed to seal the threads of the components from weather and environmental conditions. The thread protection plug is also positionable within the components so that it is flush with the stacking surface.

With the aforementioned considerations in mind, it is therefore an object of this invention to provide a thread protection plug that prevents damage to threaded components caused by exposure to weather and environmental conditions.

It is a further object of this invention to provide a thread protection plug that allows the component threads to be lubricated and protected without removal of the plug.

It is a further object of this invention to provide a thread protection plug that can quickly and efficiently insert into a variety of cast and machined components.

These and other advantages and objects of this invention shall become apparent from the ensuing description of the invention.

SUMMARY OF THE INVENTION

The invention herein comprises a body insertable within a recessed area of a component, body having an exterior, a first end and a second end. The first bore extends between the first end and the exterior of the body below the first end. The invention further comprises at least one lubrication fitting, preferably self-sealing, fluidly connected to the first bore to allow fluid flow from the first end to a point exterior of the body. The invention comprises the plug alone and in combination with a threaded component.

The invention also comprises a method for protecting a recessed area of a component using a plug, comprising the steps of (a) inserting the plug into the recessed area of the component, and, (b) pumping a protective material through the lubrication fitting to a point exterior of the body.

An alternate embodiment of the invention comprises the combination of a component having a bore extending therethrough and plug for protecting said bore. The plug comprises (a) a pair of washers positionable at opposite ends of the bore having a recessed end positionable over or at least partially within said bore; (b) a joining member engageable with the pair of washers that positions the washers over the bore; (c) a lubrication fitting positioned on at least one of the washers to allow a protective material to be inserted into said bore when the washers have been positioned over the bore.

The invention comprises an alternate method for protecting a bore configured within a component using the plug invention described in the previous paragraph. The alternate method comprises the following steps: (a) positioning washers over the opposite ends of the bore; (b) operating said the joining member so that the washers are positioned over the bore; and, (c) pumping a protective material through the lubrication fitting.

BRIEF DESCRIPTION OF THE DRAWINGS

FIG. 1 is a top view of the plug invention.

FIG. 1a is a top view of an alternate embodiment of the invention without secondary engagement surfaces.

FIG. 2 is a side view of an embodiment of the plug invention.

FIG. 2a is a side view of an alternate embodiment of the plug invention.

FIG. 3 is a cross-sectional view of an embodiment of the plug invention shown in FIG. 2 installed in a component taken along section line 3—3 in FIG. 1.

FIG. 3a is a similar cross-sectional view of an embodiment of the plug invention shown in FIG. 2a installed in a component.

DETAILED DESCRIPTION OF THE EMBODIMENTS OF THE INVENTION

Figure 6:
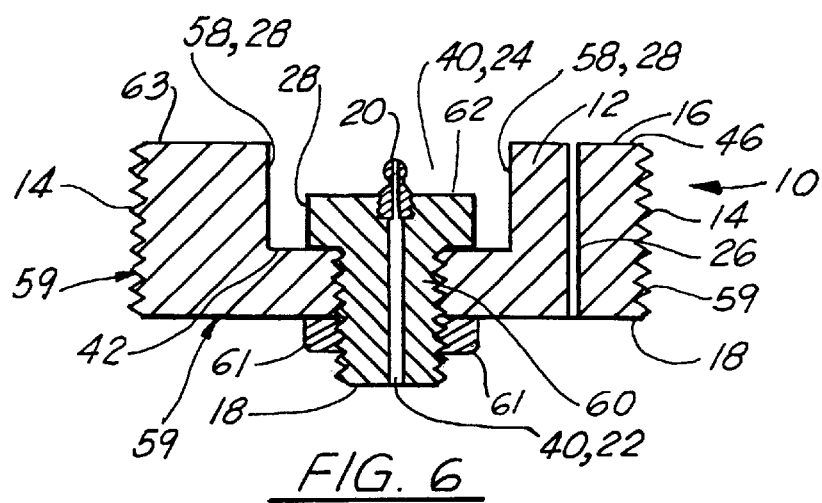
FIG. 6 is a sectional view of an alternate embodiment of the invention.

Illustrations of construction, design, and methods of operation of the invention are set forth below with specific references to the Figures. However, it is not the intention of the inventor that the scope of his invention be limited to these embodiments.

As shown in FIGS. 1, 1a, 1b, 2, and 2a, plug 10 has a substantially cylindrical body 12 with external threads 14, although body 12 need not be configured with external threads in embodiments comprising press-fitting type bodies. Body 12 and external threads 14 are configured to be insertable into a recessed area of a component 30 and to mate with an opposing internal surface, such as internal threads 36. As used herein, recessed area shall include, but is not limited to, areas below surface 46 in need of protection, such as the areas filled by plug 10 and the cavity 34 remaining below plug 10 shown in FIGS. 3 and 3a. Recessed areas also include areas extending through a component 30 such as bore 50 shown in FIGS. 4 and 5.

Body 12 has a first end 16 and a second end 18, both of which are preferably substantially planar. Body 12 also has an exterior 59, which comprises all outer surfaces of plug 10. Referring to FIG. 2, a lip 44 may extend slightly out from the edge of first end 16 to aid in the protection of the internal surface of component 30. Lip 44 may comprise a single thread as shown in FIG. 2 to allow plug 10 to remain substantially flush with surface 46 while protecting the recessed area of a component 30.

In the embodiment shown in FIG. 2a, plug 10 may be configured with a head 48 when it is not necessary that end 16 be substantially flush with surface 46, providing a larger lip 70 extending out from the edge of first end 16 as shown in FIG. 2a. Plug 10 may be constructed from a wide variety of materials, such as metal or plastic. Head 48 may take various shapes, such as round (as shown) or hexagonal.

As shown in FIG. 3, a first bore 40 extends between ends 16, 18, and may comprise recess 24 and lower bore 22. Recess 24 is preferably configured to have a substantially planar bottom surface 42. As shown in FIG. 1, the upper wall 58 of first bore 40 (or recess 24) near first end 16 may be circular in shape, but it is preferred that the upper portion be polygonal in shape, as shown in FIG. 1a, so that first bore 40 (or recess 24) is engageable by a polygonal wrench.

Referring back to FIG. 3, a lubrication fitting 20, preferably a Zerk-type fitting as manufactured by Alemite Corporation, is positioned within the recess 24 and fluidly connects recess 24 to lower bore 22 formed through body 12 to allow fluid flow through first bore 40 from first end 16 to a point exterior of body 12, preferably near second end 18. Fitting 20 prevents back-flow along that same path. Protective material, such as grease, enters fitting 20 and passes through body 12, out through lower bore 22. Both recess 24 and fitting 20 are preferably constructed so that no portion of fitting 20 extends beyond first end 16.

As shown in FIGS. 1, 1a and 3, a second bore 26 may be positioned within body 12 between first end 16 and the exterior of body 12 below first end 16 to allow grease to pass back through body 12 after the cavity area 34 between second end 18 and the bottom of the recessed area of the component 30 has been filled with grease. As used herein "at an exterior point below first end" means any point along the exterior 59 of plug other than top surface 63. This allows the user of plug 10 to know when cavity area 34 has been completely filled with grease. Second bore 26 may extend from first end 16 as shown in FIG. 3a or may extend from the bottom of engagement hole 32 as shown in FIG. 3. Second bore 26 may exit at second end 18 or at some other point exterior of body 12, such as a point within the area of external threads 14.

Figure 1B:
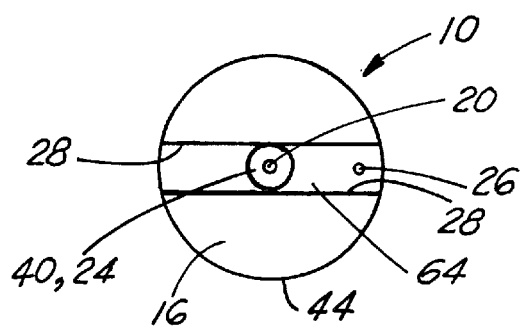
FIG. 1b is a top view of an alternate embodiment of the invention.

Engagement surfaces 28 may be formed within first end 16. As shown in FIGS. 1 and 3, engagement surfaces 28 comprise engagement holes 32. Engagement holes 32 are sized and spaced apart sufficiently to allow engagement by the prongs of a spanner wrench as shown in the attached drawing. Engagement holes 32 may be configured in other ways to allow for engagement by other tools, such as the polygonal recess 24, shown in FIG. 1a, where upper wall 58 serves as an engagement surface 28. As shown in FIG. 1b, engagement surface 28 may comprise a slot 64 traversing at least a portion of top surface 63 to allow engagement by a tool. The bottom of slot 64 may terminate above the upper end of fitting 20 so that when a tool engages slot 64, the tool will not damage fitting 20.

In operation, plug 10 is inserted into the recessed area 38 of the component 30. When component 30 has a threaded recessed area, plug 10 is simply screwed into recessed area 38 until first end 16 has become at least substantially flush with the surface 46 of component 30. When it is not necessary that upper end 16 of plug 10 be substantially flush with surface 46, the embodiment shown in FIGS. 2a and 3a may be used, and engagement surface 28 may be located on head 48 or along upper wall 58 as previously described. A grease gun is then attached to lubrication fitting 20, and grease is pumped through lubrication fitting 20, into cavity area 34 and any voids that may exist between opposing threads 14, 36. Grease is pumped through lubrication fitting 20 until grease flows between opposing threads 14, 36 to surface 46 or flows through second bore 26 and becomes visible to the operator. Preferably, a water-resistant or waterproof grease is used.

Figure 4:
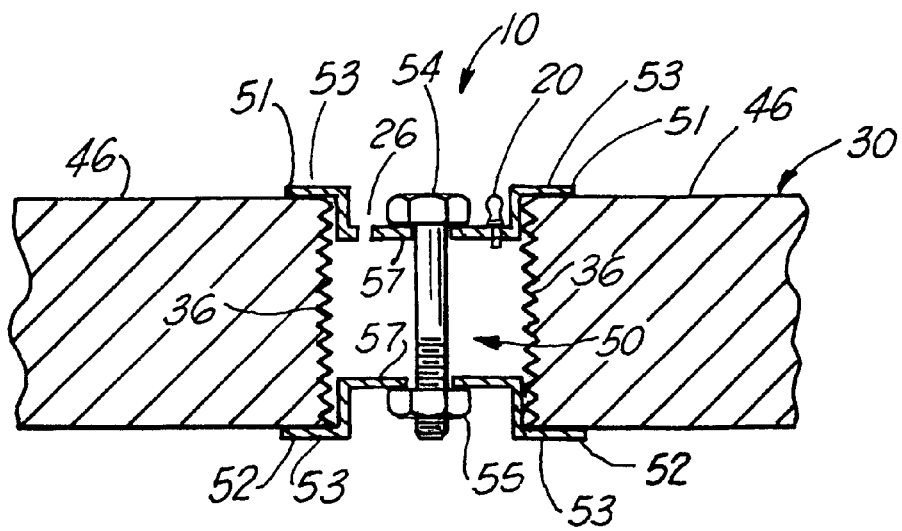
FIGS. 4 and 5 are cross-sectional views of an alternate embodiment of the invention used for components having bores extending completely therethrough.
Figure 5:
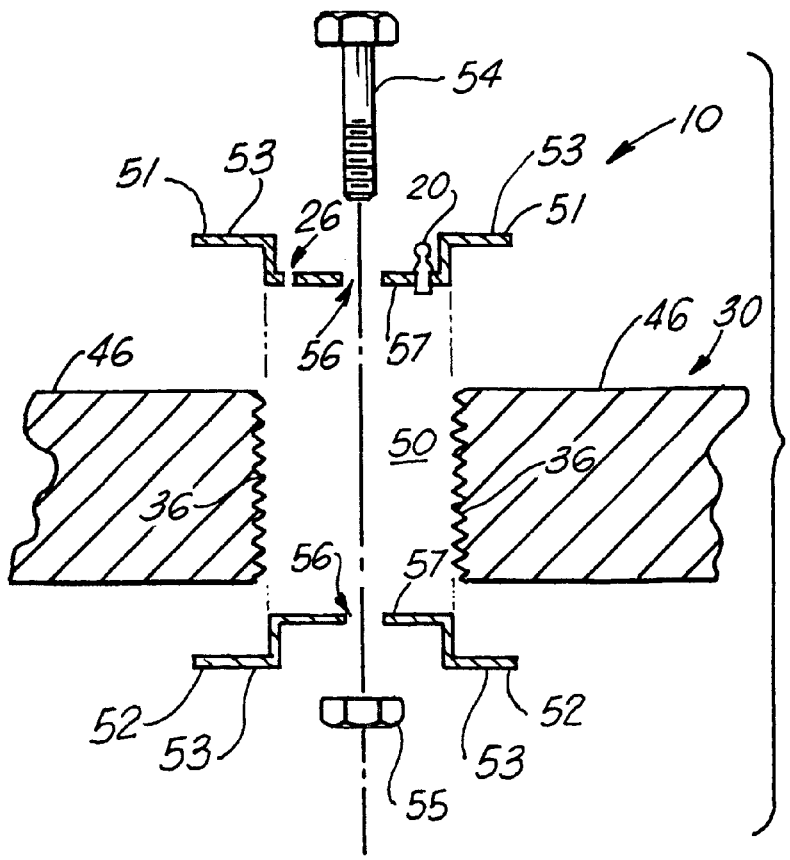

An alternate embodiment of the invention is shown in FIG. 4 for use with a component 30 having a bore 50 extending completely therethrough. Plug 10 comprises a top washer 51 and a bottom washer 52 positionable over or at least partially within bore 50. Each washer 51, 52 has a first end 53, preferably flanged as shown, that allow the recessed ends 57 of washers 51, 52 to rest substantially within bore 50. Each washer 51, 52 is configured with an aperture 56 therein to allow a bolt 54 to pass therethrough. Washers 51, 52 are mounted to the components by positioning them at opposite ends of bore 50, inserting bolt 54 through the washer apertures 56, and securing a nut 55 to bolt 54 until washers 51, 52 are positioned over bore 50, preferably securely positioned. Either washer 51, 52 or bolt 54 may be configured with a lubrication fitting 20 or second bore 26 so that plug 10 operates as previously described. As used in the claims, "joining member" describes nut 55 and bolt 54, or any other device or apparatus known in the art, used to releasably join or connect two washers 51, 52.

Figure 7:
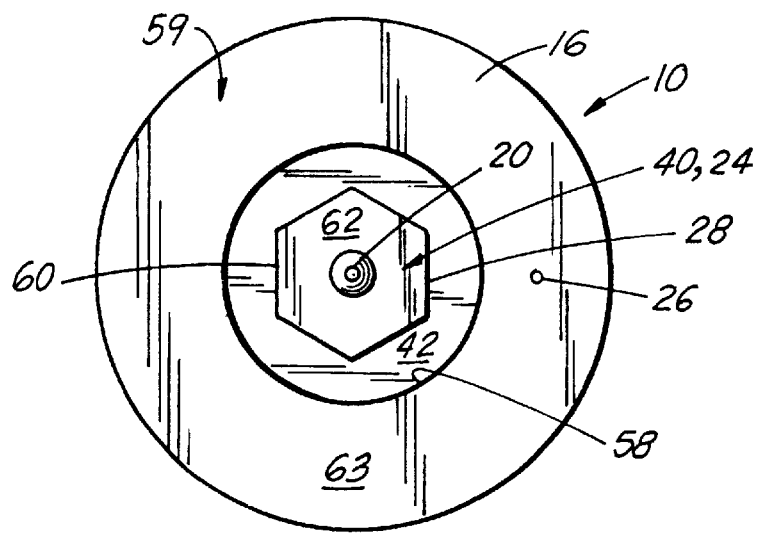
FIG. 7 is a top view of the embodiment shown in FIG. 6.

Another alternate embodiment of the invention 10 is shown in FIGS. 6 and 7. In this embodiment, a threaded bolt 60 or other suitable member is fixedly positioned longitudinally within and included as part of body 12. Lubrication fitting 20 is attached to bolt head 62 and is fluidly connected to lower bore 22, which extends through bolt 60 to second end 18 or a point exterior of body 12 below first end 16. Bolt 60 may be fixed in a position within body 12 by welds 61 or other suitable means. Bolt head 62 and lubrication fitting 20 are preferably contained within recess 24. Engagement surface 28 may be provided on bolt head 62 and may take the form of a standard hex head or any other regular polygonal shape, as shown in FIG. 7. Alternatively, as previously described, upper wall 58 may form an engagement surface 28. Sufficient area should be provided around bolt head 62 for insertion of a socket wrench or similar tool to operate plug 10.

Although the preferred embodiment has been described, it will be appreciated by those skilled in the art to which the present invention pertains that modifications, changes, and improvements may be made without departing from the spirit of the invention defined by the claims.

I claim:

1. In combination with a component having an exterior surface and a recess in said surface, at least a portion of said recess including a generally cylindrical threaded interior surface, said recess opening only to said exterior surface, a protection plug, comprising:

(a) a body having an exterior, a first end and a second end, said body being insertable within said recess, said body including a threaded exterior threadably engagable with said threaded interior surface, said second end being oriented toward said bottom of said recess;

(b) a first bore extending through said body between said first end and said second end; and (c) a lubrication fitting fluidly connected to said first bore at a point accessible from said first end of said body.

2. A protection plug according to claim 1, wherein said body further includes a second bore, said second bore extending between said first end and said exterior of said body below said second end.

3. A protection plug according to claim 1, wherein said lubrication fitting does not extend beyond said first end.

4. A protection plug according to claim 1, wherein said body further comprises one or more engagement surfaces positioned near said first end.

5. A protection plug according to claim 4, wherein said engagement surface comprises one or more engagement holes in said first end.

6. A protection plug according to claim 2, wherein said body further comprises one or more engagement surfaces positioned near said first end.

7. A protection plug according to claim 6, wherein said engagement surface comprises one or more engagement holes in said first end.

8. A protection plug according to claim 7, wherein said second bore extends between said exterior of said body below said first end and at least one of said engagement holes.

9. A protection plug according to claim 5, wherein said engagement surface comprises an enlarged portion of said first bore near said first end, said enlarged portion having a non-circular cross-section.

10. A protection plug according to claim 9, wherein said enlarged portion of said first bore is provided with a polygonal cross-section.

11. A protection plug according to claim 9, wherein said lubrication fitting is positioned within said enlarged portion of said first bore.

12. A protection plug according to claim 1, wherein said body further comprises a lip extending outward from said first end.

13. A protection plug according to claim 1, wherein said lubrication fitting allows fluid flow through said fitting into said first bore and prevents back-flow through said fitting.

14. A protection plug according to claim 3, wherein said lubrication fitting is positioned within an enlarged portion of said first bore near said first end of said body, such that said lubrication fitting does not extend substantially beyond said first end.

15. A protection plug according to claim 1, wherein said body is shaped such that said body is threadable into said recess such that said first end is substantially flush with said exterior surface of said component.

16. In a component having an exterior surface and a recess in said surface, at least a portion of said recess including a generally cylindrical threaded interior surface, said recess opening only to said exterior surface, a method for protecting said threaded interior surface, comprising the steps of:

(a) providing a protection plug, comprising:

(i) a body having an exterior, a first end and a second end, said body being insertable within said recess, said body including a threaded exterior portion threadably engagable with said threaded interior surface, said second end being oriented toward said bottom of said recess;

(ii) a first bore extending through said body between said first end and said second end; and (iii) a lubrication fitting fluidly connected to said first bore at a point accessible from said first end of said body;

(b) inserting said protection plug into said recess, threadably engaging said threaded portion with said threaded interior surface; and (c) injecting a protective material through said lubrication fitting and said first bore into said recess.

* * * * *